United States Patent [19]

Lacasse

[11] 4,305,440
[45] Dec. 15, 1981

[54] CUTTING TOOL
[75] Inventor: Ernest Lacasse, St. Romuald, Canada
[73] Assignee: Centre de Recherche Industrielle du Quebec, Quebec, Canada
[21] Appl. No.: 102,982
[22] Filed: Dec. 11, 1979
[30] Foreign Application Priority Data Nov. 14, 1979 [CA] Canada .................................. 339816

[51] Int. Cl.³ .............................................. B26D 1/12
[52] U.S. Cl. ...................................... 144/230; 407/45
[58] Field of Search ...................... 144/42, 114, 117 R, 144/117 B, 162 R, 172, 174, 230, 323; 407/37, 40, 45, 47, 49

[56] References Cited

U.S. PATENT DOCUMENTS

| 994,264 | 6/1911 | MacKay | 144/230 |
|---|---|---|---|
| 3,014,511 | 12/1961 | Kirsten | 144/230 |
| 3,017,912 | 1/1962 | Sybertz et al. | 144/42 X |
| 3,882,582 | 5/1975 | Williams | 407/37 |
| 3,933,189 | 1/1976 | Boles et al. | 407/45 |
| 4,074,737 | 2/1978 | Stewart | 114/117 R |
| 4,163,624 | 8/1979 | Eckle | 407/45 |

FOREIGN PATENT DOCUMENTS 22546 2/1959 German Democratic Rep. .................................... 144/174

Primary Examiner—D. Bray
Attorney, Agent, or Firm—Cushman, Darby & Cushman

[57] ABSTRACT

The specification describes a cutting tool comprising a cylindrical support having a series of cavities arranged in helicoidal rows on its outer surface; in each cavity, a tool-carrier and a chip-breaker are secured by means of a set-screw; means are provided for adjusting the height of the tool-carrier and the chip-breaker, for the purpose of adjusting the position of the blades of these elements within the cavity.

12 Claims, 4 Drawing Figures

CUTTING TOOL

The present invention relates to a cutting tool.

In the wood industry, as in the metal industry, the cutting of material is an important step in the production process; but it is also one of the main sources of noise. Conventional cutting tools or "cylinders" consist of a steel or aluminum tool-carrier and of straight cutters of the same length as the tool-carriers and located in the longitudinal direction of the axis; a cylinder of this kind is described in U.S. Pat. No. 3,791,429 issued on Feb. 12, 1974 to P. H. Morris.

Cutting tools of the type described are used mainly in the wood industry in planing machines, thicknessing machines, wood-carving machines or routers. The problems they present are of various kinds and are related to their design and to the material used. On the one hand, the entire length of the cutter comes into contact with the wood at right angles to its edge; not only is this an important source of noise, but more resistance is created and a more powerful motor is required. On the other hand, even carbide cutters require frequent sharpening which involves, among other things, production shut-downs, the duration of which depends upon the degree of deterioration of the cutters.

A second type of cylindrical tool, known as helicoidal, is now on the market, as described in U.S. Pat. No. 3,574,251, issued on Apr. 13, 1971 to M. A. Corti and U.S. Pat. Nos. 3,785,417 issued on Jan. 15, 1974 to Vora. These cylinders are characterized in that the cutters are very much smaller and are arranged around the tool-carrier at an angle to the axis of rotation, thus producing a helicoidal movement. The contact during cutting is therefore progressive, which is easier and has the effect of reducing noise and the amount of power required to drive the tool. It also produces a better finish.

The present invention relates to an improvement to this second type of cylinder and consists in providing the helicoidal cylinders with chip-breakers located ahead of the cutters, the purpose of which is to facilitate the breaking of the chips, thus improving the finish.

The present invention is also concerned with means for adjusting the tool-carrier and the chip-breaker in each cavity. Adjustment of the tool-carrier makes it possible to make use of a larger percentage of the material sharpened. Adjustment of the chip-breaker makes it possible to machine different species of wood efficiently.

The present invention therefore relates to a cutting tool which comprises: a support having a cylindrical outer surface; a series of cavities spaced over this surface in at least one helicoidal row; a tool-carrier in each of these cavities, the tool-carrier comprising, in the upper part thereof and near the outer surface of the support, a cutter; a chip-breaker in each of the cavities, the chip-breakers comprising, in the upper parts thereof, near the outer surface of the support, blades arranged close to the cutters in the tool-carriers; means for adjusting the position of the cutter in the tool-carrier in the cavity; means for adjusting the position of the chip-breaker blade in relation to the tool-carrier cutter; and retention means for securing the tool-carrier and the chip-breaker in the cavity.

An additional characteristic of the present invention is that the cavity has cylindrical lateral walls defining an obtuse angle to the interior, in such a manner that the wedging action of the chip-breaker and the tool-carrier, in the cavity, is increased by the centrifugal action produced by rotation of the cutting tool. Another characteristic is that the lateral bolt locking the elements in the cavity is held by the cylinder structure and works in compression.

The invention will be better understood from the following description of a form of execution of the invention which is given by way of example and is in no way restrictive. The description relates to the drawings attached hereto, wherein.

Figure 1:
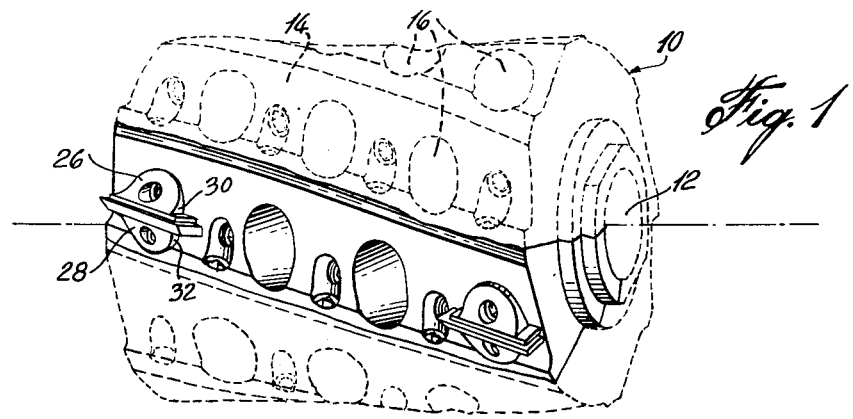
FIG. 1 is a perspective view of a cutting tool designed in accordance with one form of the present invention; the figure shows only two cavities, each comprising a chip-breaker and a tool-carrier.
Figures 2, 3:
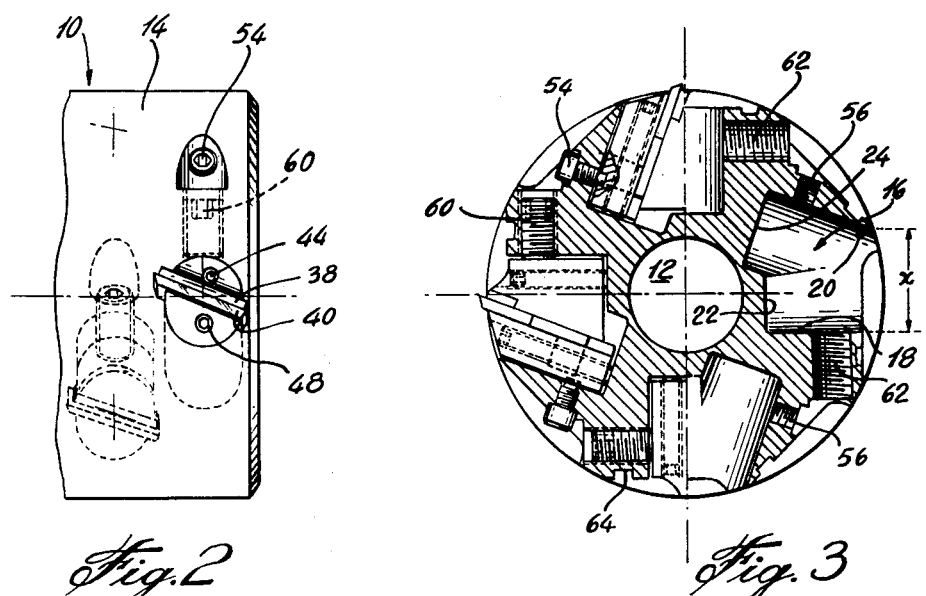
FIG. 2 is a side elevation of one end of the cutting tool.
FIG. 3 is a cross-section of the cutting tool.
Figure 4:
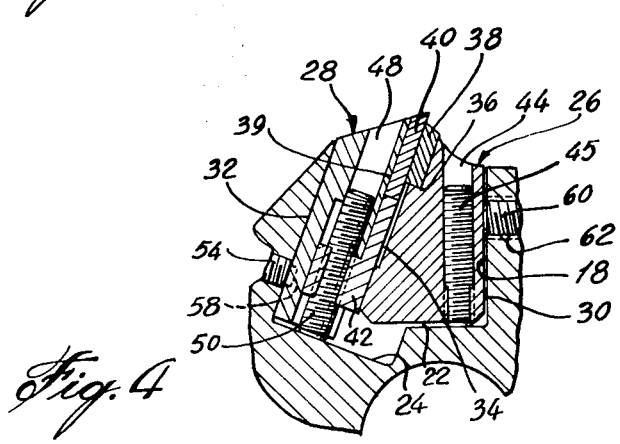
FIG. 4 is an enlarged view, in cross-section, showing a chip-breaker and a tool-carrier in one of the cavities of the cutting tool.

With reference to FIGS. 1 to 4, the cutting tool designed according to the present invention comprises a support 10 having a generally cylindrical outer surface 14 and a cylindrical axial bore 12 to allow the tool to be mounted upon a rotating shaft (not shown). The support may be of steel or aluminum and is provided, on its outer surface 14, with a series of cavities 16 spaced from each other in a helicoidal row. The dimensions of outer surface 14, and the number of helicoidal rows of cavities, are obviously a function of the work to be done and are therefore optional. Each cavity 16 has partly cylindrical internal lateral walls 18,20, the walls forming an obtuse angle, in such a manner that the cavity formed by bases 22 and 24, at different levels, has an overall dimension which is larger than oblong aperture X at the surface. The purpose of the special shape of this cavity will be described hereinafter.

A chip-breaker 26 and a tool-carrier 28 occupy the space is in each cavity 16. One part 30 of the body of chip-breaker 26 is cylindrical in shape and matches the partly cylindrical shape of internal wall 18 of the cavity. The chip-breaker also has a sectioned part in a plane at an angle to the axis of the body, thus defining a sloping surface 34, the upper part of which comprises a recess 36, in which is secured, either by welding or by some other method, a blade such as steel blade 38. One part 32 of the body of the tool-carrier 28 is cylindrical and matches the partly cylindrical shape of internal wall 20 of the cavity. The tool-carrier also has a flat surface 39 upon which two detachable elements 40,42 slide. Element 40 is a blade, for example a tungsten-carbide button, which bears against blade 38, and is slightly higher. Blade 40 rests upon the upper part of element 42 which comprises a part with a threaded hole mounted upon an adjusting screw 50. The latter bears upon base 24 of the cavity and extends into the interior of longitudinal aperture 48 in the body of the tool-carrier. A socket-headed screw makes it possible to adjust the height of element 42 in relation to tool-carrier 28 and cavity 16; the position of blade 40 is simultaneously adjusted in relation to the cavity and the chip-breaker.

The height of chip-breaker 26 is also adjustable. A longitudinal aperture 44 is provided in the body of the chip-breaker and is threaded to receive an adjusting screw 45 which bears upon base 22 of the cavity, the upper part of the screw having a slot which makes it possible to adjust the relative height of the chip-breaker inside the cavity. The chip-breaker must be adjustable because of the type of wood that may be used with this type of cutting tool. Even in a given species, maple, for instance, the grain may be closer and the wood may be more difficult to machine; differences in density are more marked in other woods. An adjustable chip-breaker allows different species of wood to be machined efficiently.

As soon as the chip-breaker and tool-carrier have been inserted consecutively into cavity 16, accurate positioning of tool-carrier 28 in the cavity is achieved by means of a lock-screw 54 inserted into a lateral hole passing through the support; one end of the screw emerged from the outer surface of the support while the other end bears upon a depression 58 in the cylindrical wall of the body of tool-carrier 28. One end of a set-screw 60, running in a threaded lateral hole 62, bears upon cylindrical surface 30 of the chip-breaker, thus wedging the latter against the tool-carrier which, in turn, bears against cylindrical wall 20 of the cavity.

The cylindrical support of the cutting tool also has grooves 64 describing a helicoidal line at any point parallel with the helicoidal line of the buttons; these grooves serve to receive and guide the tools when the tool-carrier cutter is sharpened.

With reference to FIG. 1, cavities 16 in two successive helicoidal rows are staggered circumferentially in relation to each other. This permits a continuous, progressive cut during the entire revolution of the cutting tool.

One important characteristic of the present invention is that opening in each cavity 16 is smaller than the tool-carrier and chip-breaker assembly; this small opening ensures that the elements will not fly out of the cavity under the centrifugal force produced by the rotation of the cutting tool.

The embodiments of the invention in which an exclusive property or privilege is claimed are defined as follows:

1. A cutting tool comprising: a support having a cylindrical outer surface; a series of cavities spaced over said surface in at least one helicoidal row; a tool-carrier in each of said cavities, said tool-carrier including, in the upper part thereof and near the outer surface of said support, a cutter; a chip-breaker in each of said cavities, said chip-breaker including, in the upper part thereof and near the outer surface of said support, a blade arranged near the cutter in said tool-carrier; means for adjusting the position of the cutter in the tool-carrier in said cavity; means for adjusting the position of the chip-breaker blade in relation to the tool-carrier cutter; and retention means for securing the tool-carrier and the chip-breaker in said cavity, said retention means extending laterally from said cavity, through said support, and being accessible at said outer surface for said securing.

2. A cutting tool as defined in claim 1, wherein said means for adjusting the tool-carrier cutter comprising a threaded element engaged in a longitudinal aperture arranged in the tool-carrier and bearing upon the bottom of said cavity; said tool-carrier cutter being integral with said element, in such a manner that adjustment of said element results in adjustment of the tool-carrier cutter.

3. A cutting tool as defined in claim 1 or 2, wherein said means for adjusting the chip-breaker comprising a threaded element engaged in a longitudinal aperture arranged in the chip-breaker and bearing upon the bottom of the cavity.

4. A cutting tool as defined in claim 1, wherein said retention means comprising a lateral set-screw, passing through said support, the upper end of which emerges from the outer surface of the support, while the lower end thereof bears upon the chip-breaker, thus making it possible to wedge the chip-breaker and the tool-carrier in the cavity.

5. A cutting tool as defined in claim 1, wherein the cutter is made of tungsten-carbide.

6. A cutting tool as defined in claim 1, wherein the chip-breaker blade is made of steel.

7. A cutting tool as defined in claim 1, and comprising locking means serving to align the tool-carrier in said cavity, said means comprising a screw passing through said support, the head of said screw emerging from the outer surface thereof, while the lower part engages in a recess in the tool-carrier.

8. A cutting tool as defined in claim 1, wherein said cavity comprises lateral walls defining an obtuse angle in relation to the cavity aperture so as to form a cavity converging towards the outside and to increase the wedging action of the chip-breaker and tool-carrier resulting from the centrifugal effect produced by rotation of said support.

9. A cutting tool as defined in claim 8, wherein said lateral walls are cross-sectionally cylindrical, the tool-carrier and the chip-breaker each comprising flat surfaces abutting against each other, and cylindrical walls matching said cylindrical walls of said cavity; and said chip-breaker and tool-carrier together defining a base area larger than the area of the cavity aperture.

10. A cutting tool as defined in claim 1, wherein said outer surface of the support comprises at least one helicoidal groove used in sharpening said cutter and blade and running along a line parallel with said helicoidal row.

11. A cutting tool as defined in claim 1, and comprising a plurality of rows of cavities, the cavities in two consecutive rows being staggered circumferentially in such a manner that there is no interruption in the cut produced by the tools.

12. A cutting tool comprising: a support having a cylindrical outer surface; a seris of cavities spaced over said surface in at least one helicoidal row; a tool-carrier in each of said cavities, said tool-carrier including, in the upper part thereof and near the outer surface of said support, a cutter; a chip-breaker in each of said cavities, said chip-breaker including, in the upper part thereof and near the outer surface of said support, a blade arranged near the cutter in said tool-carrier; means for adjusting the position of the cutter in the tool-carrier in said cavity; means for adjusting the position of the chip-breaker blade in relation to the tool-carrier cutter; and retention means for securing the tool-carrier and the chip-breaker in said cavity, said means for adjusting the tool-carrier cutter comprising a threaded element engaged in a longitudinal aperture arranged in the tool-carrier and bearing upon the bottom of said cavity; said tool-carrier cutter being integral with said element, in such a manner that adjustment of said element results in adjustment of the tool-carrier cutter.

* * * * *